United States Patent
Madan et al.

(10) Patent No.: US 9,084,203 B2
(45) Date of Patent: Jul. 14, 2015

(54) METHODS AND APPARATUS FOR PROVIDING TRANSMIT POWER CONTROL FOR DEVICES ENGAGED IN D2D COMMUNICATIONS

(75) Inventors: Ritesh K. Madan, Jersey City, NJ (US);
Saurabh Tavildar, Jersey City, NJ (US);
Cyril Measson, Somerville, NJ (US);
Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 13/476,541

(22) Filed: May 21, 2012

(65) Prior Publication Data
US 2013/0310103 A1 Nov. 21, 2013

(51) Int. Cl.
*H04B 7/00* (2006.01)
*H04W 52/24* (2009.01)
*H04W 52/38* (2009.01)
*H04W 52/14* (2009.01)

(52) U.S. Cl.
CPC .......... *H04W 52/242* (2013.01); *H04W 52/383* (2013.01); *H04W 52/386* (2013.01); *H04W 52/146* (2013.01); *H04W 52/243* (2013.01); *Y02B 60/50* (2013.01)

(58) Field of Classification Search
CPC ............ H04W 52/146; H04W 52/242; H04W 52/244; H04W 52/383
USPC ....................................................... 455/522
See application file for complete search history.

(56) References Cited

U.S. PATENT DOCUMENTS

| | | | |
|---|---|---|---|
| 7,324,785 B2 | 1/2008 | Hansen et al. | |
| 2005/0136961 A1* | 6/2005 | Simonsson et al. | 455/522 |
| 2006/0040696 A1* | 2/2006 | Lin | 455/522 |
| 2008/0069039 A1 | 3/2008 | Li et al. | |
| 2009/0325625 A1 | 12/2009 | Hugl et al. | |
| 2010/0093364 A1 | 4/2010 | Ribeiro et al. | |
| 2010/0317394 A1 | 12/2010 | Harris et al. | |
| 2011/0013560 A1* | 1/2011 | Zhang et al. | 370/328 |
| 2011/0021235 A1* | 1/2011 | Laroia et al. | 455/522 |
| 2011/0159913 A1* | 6/2011 | Yang et al. | 455/522 |
| 2011/0182280 A1 | 7/2011 | Charbit et al. | |
| 2011/0275382 A1 | 11/2011 | Hakola et al. | |

(Continued)

OTHER PUBLICATIONS

International Search Report and Written Opinion—PCT/US2013/042046—ISA/EPO—Jul. 8, 2013.

(Continued)

*Primary Examiner* — Simon Nguyen
(74) *Attorney, Agent, or Firm* — James K. O'Hare

(57) ABSTRACT

A method, an apparatus, and a computer program product for wireless communication are provided for using power control to reduce potential interference to a macro eNB by a UE engaged in D2D communications. An eNB may be operable to generate a fractional power control parameter based on a macro eNB power saturation value and broadcast the factional power control parameter. A UE may be equipped to receive the factional power control parameter and determine whether the fractional power control parameter plus a path loss value between the UE and the macro eNB is less than a maximum power used for the D2D communications. The UE may reduce the maximum transmit power used for D2D communications when the fractional power control parameter plus a path loss value between the UE and the macro eNB is less than a maximum power used for the D2D communications.

22 Claims, 17 Drawing Sheets

(56) References Cited

U.S. PATENT DOCUMENTS

| | | | |
|---|---|---|---|
| 2012/0028630 A1* | 2/2012 | Yamamoto et al. | 455/422.1 |
| 2012/0028672 A1* | 2/2012 | Chen et al. | 455/522 |
| 2012/0300662 A1* | 11/2012 | Wang et al. | 370/252 |
| 2012/0315936 A1* | 12/2012 | Sawai et al. | 455/501 |
| 2013/0040675 A1* | 2/2013 | Ant et al. | 455/509 |
| 2013/0107866 A1* | 5/2013 | Leu et al. | 370/335 |
| 2013/0272173 A1* | 10/2013 | Niu et al. | 370/280 |
| 2013/0294390 A1* | 11/2013 | Yang et al. | 370/329 |
| 2013/0324182 A1* | 12/2013 | Deng et al. | 455/522 |
| 2014/0113677 A1* | 4/2014 | Parkvall et al. | 455/522 |
| 2014/0153390 A1* | 6/2014 | Ishii et al. | 370/230 |
| 2014/0171143 A1* | 6/2014 | Liu et al. | 455/522 |
| 2014/0179324 A1* | 6/2014 | Lee | 455/437 |
| 2014/0274196 A1* | 9/2014 | Dai et al. | 455/522 |

OTHER PUBLICATIONS

Janis, P., et al., "Device-to-Device Communication Underlaying Cellular Communications Systems", Int'l J. of Communications, Network and System Sciences, vol. 02, No. 03, Jan. 1, 2009, pp. 169-247, XP055068717, ISSN: 1913-3715, DOI: 10.4236/ijcns.2009.23019.

* cited by examiner

600

Superframe Index = 0

| 0 | 1 | 2 ... | 10 | 11 | 12 ... 30 | 31 |
|---|---|---|---|---|---|---|
| RCH | | MCCH | | TCCH | ... | TCCH |

Frame Index

Superframe Index = 1:6

| 0 | 1 | 2 | 3 | 4 | 5 ... 30 | 31 |
|---|---|---|---|---|---|---|
| RCH | TCCH | | TCCH | | ... | TCCH |

Frame Index

Superframe Index = 7

| 0 | 1 | 2 ... | 10 | 11 | 12 ... 30 | 31 |
|---|---|---|---|---|---|---|
| RCH | | MCCH | | TCCH | ... | TCCH |

Frame Index

Superframe Index = 8:14

| 0 | 1 | 2 | 3 | 4 | 5 ... 30 | 31 |
|---|---|---|---|---|---|---|
| RCH | TCCH | TCCH | | | ... | TCCH |

Frame Index

FIG. 6

METHODS AND APPARATUS FOR PROVIDING TRANSMIT POWER CONTROL FOR DEVICES ENGAGED IN D2D COMMUNICATIONS

BACKGROUND

1. Field

The present disclosure relates generally to communication systems, and more particularly, to a system for using power control to reduce potential interference to a macro evolved NodeB (eNB) by a user equipment (UE) engaged in device to device (D2D) communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

The wireless communications system may include a plurality UEs and a plurality of eNBs. The UEs may be associated with difference eNBs and the eNBs may be associated with different cells. A first UE associated with a first eNB in a first cell and a second UE associated with a second eNB in a second cell may be operable to communicate directly with each other using resources allocated for D2D communications. Devices in neighboring cells may be allocated different sets of resources for D2D communication. As such, a method and apparatus for determining available resources for D2D communication between UEs associated with different eNBs is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with using power control to reduce potential interference to a macro eNB by a UE engaged in D2D communications. In one example, an eNB may be operable to generate a fractional power control parameter based on a macro eNB power saturation value and broadcast the factional power control parameter so as to prompt any UEs engaged in D2D communications to maintain a transmit power level below a power level based on the fractional power control parameter. A UE may be equipped to receive the factional power control parameter and determine whether the fractional power control parameter plus a path loss value between the UE and the macro eNB is less than a maximum power used for the D2D communications. The UE may reduce the maximum transmit power used for D2D communications when the fractional power control parameter plus a path loss value between the UE and the macro eNB is less than a maximum power used for the D2D communications.

According to related aspects, a method for using power control to reduce potential interference to a macro eNB by a UE engaged in D2D communications is provided. The method can include generating a fractional power control parameter based on a macro eNB power saturation value. Moreover, the method can include broadcasting the fractional power control parameter to prompt one or more UEs engaged in D2D communications to maintain a transmit power level below a power level based on the fractional power control parameter.

Another aspect relates to a wireless communications apparatus. The wireless communications apparatus can include means for generating a fractional power control parameter based on a macro eNB power saturation value. Moreover, the wireless communications apparatus can include means for broadcasting the fractional power control parameter to prompt one or more UEs engaged in D2D communications to maintain a transmit power level below a power level based on the fractional power control parameter.

Another aspect relates to a wireless communications apparatus. The apparatus can include a processing system configured to generate a fractional power control parameter based on a macro eNB power saturation value. Moreover, the processing system may be configured to broadcast the fractional power control parameter to prompt one or more UEs engaged in D2D communications to maintain a transmit power level below a power level based on the fractional power control parameter.

Another aspect relates to a computer program product, which can have a computer-readable medium comprising code for generating a fractional power control parameter based on a macro eNB power saturation value. Moreover, the computer-readable medium can include code for broadcasting the fractional power control parameter to prompt one or more UEs engaged in D2D communications to maintain a transmit power level below a power level based on the fractional power control parameter.

According to another related aspect, a method for using power control to reduce potential interference to a macro eNB by a UE engaged in D2D communications is provided. The method can include receiving, by a UE, a fractional power control parameter from a macro eNB while being engaged in D2D communications. Moreover, the method can include determining whether the a first value, defined by the fractional power control parameter plus a path loss value between the UE and the macro eNB, is less than a second value defined by a maximum power used for the D2D communications.

Another aspect relates to a wireless communications apparatus. The wireless communications apparatus can include means for receiving, by a UE, a fractional power control parameter from a macro eNB while being engaged in D2D communications. Moreover, the wireless communications apparatus can include means for determining whether the a first value, defined by the fractional power control parameter plus a path loss value between the UE and the macro eNB, is less than a second value defined by a maximum power used for the D2D communications.

Another aspect relates to a wireless communications apparatus. The apparatus can include a processing system configured to receive a fractional power control parameter from a macro eNB while being engaged in D2D communications. Moreover, the processing system may be configured to determine whether the a first value, defined by the fractional power control parameter plus a path loss value between the UE and the macro eNB, is less than a second value defined by a maximum power used for the D2D communications.

Another aspect relates to a computer program product, which can have a computer-readable medium comprising code for receiving, by a UE, a fractional power control parameter from a macro eNB while being engaged in D2D communications. Moreover, the computer-readable medium can include code for determining whether the a first value, defined by the fractional power control parameter plus a path loss value between the UE and the macro eNB, is less than a second value defined by a maximum power used for the D2D communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating the channels in each frame of superframes in one grandframe.

DETAILED DESCRIPTION

Figure 1:
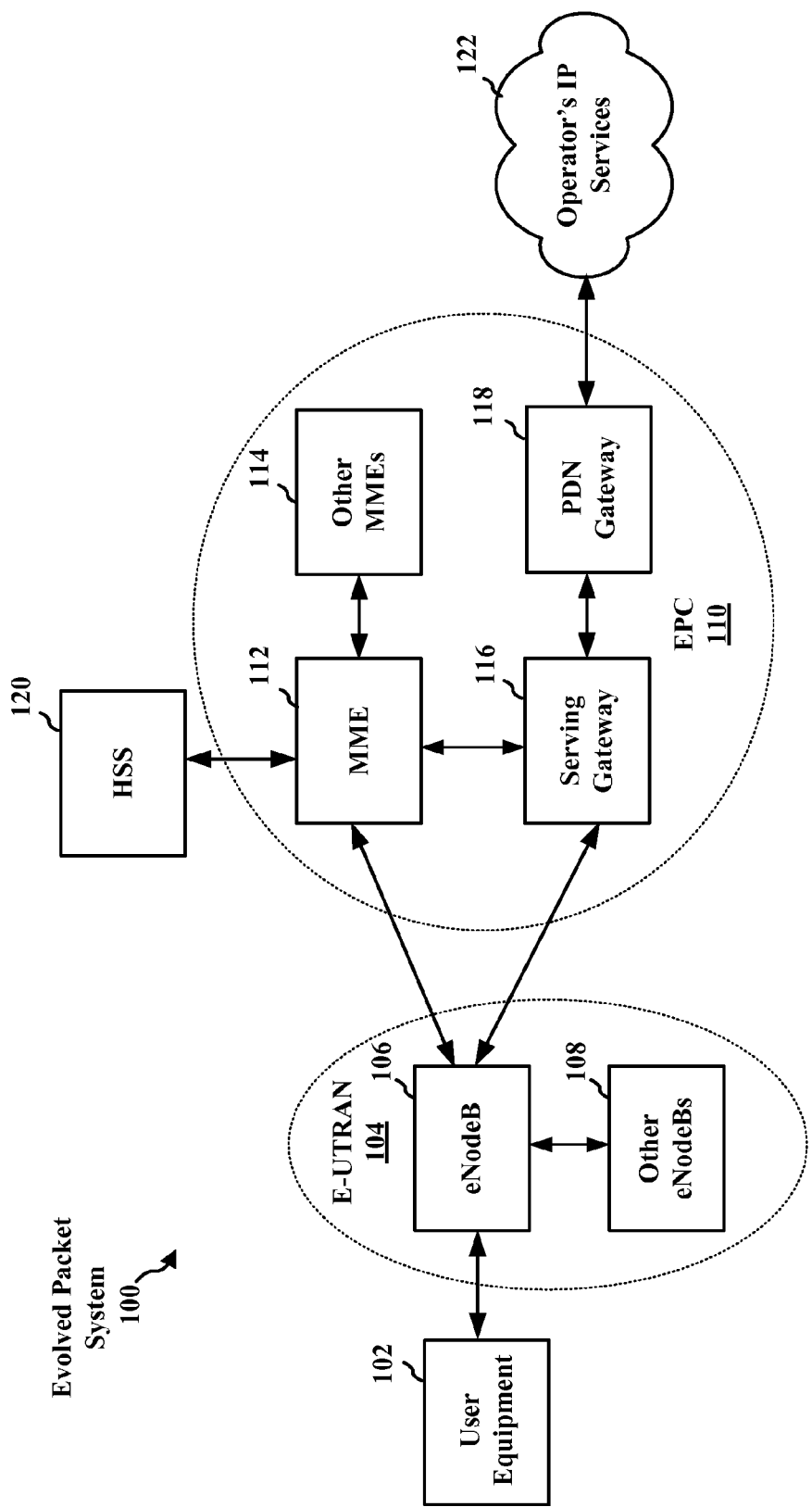
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
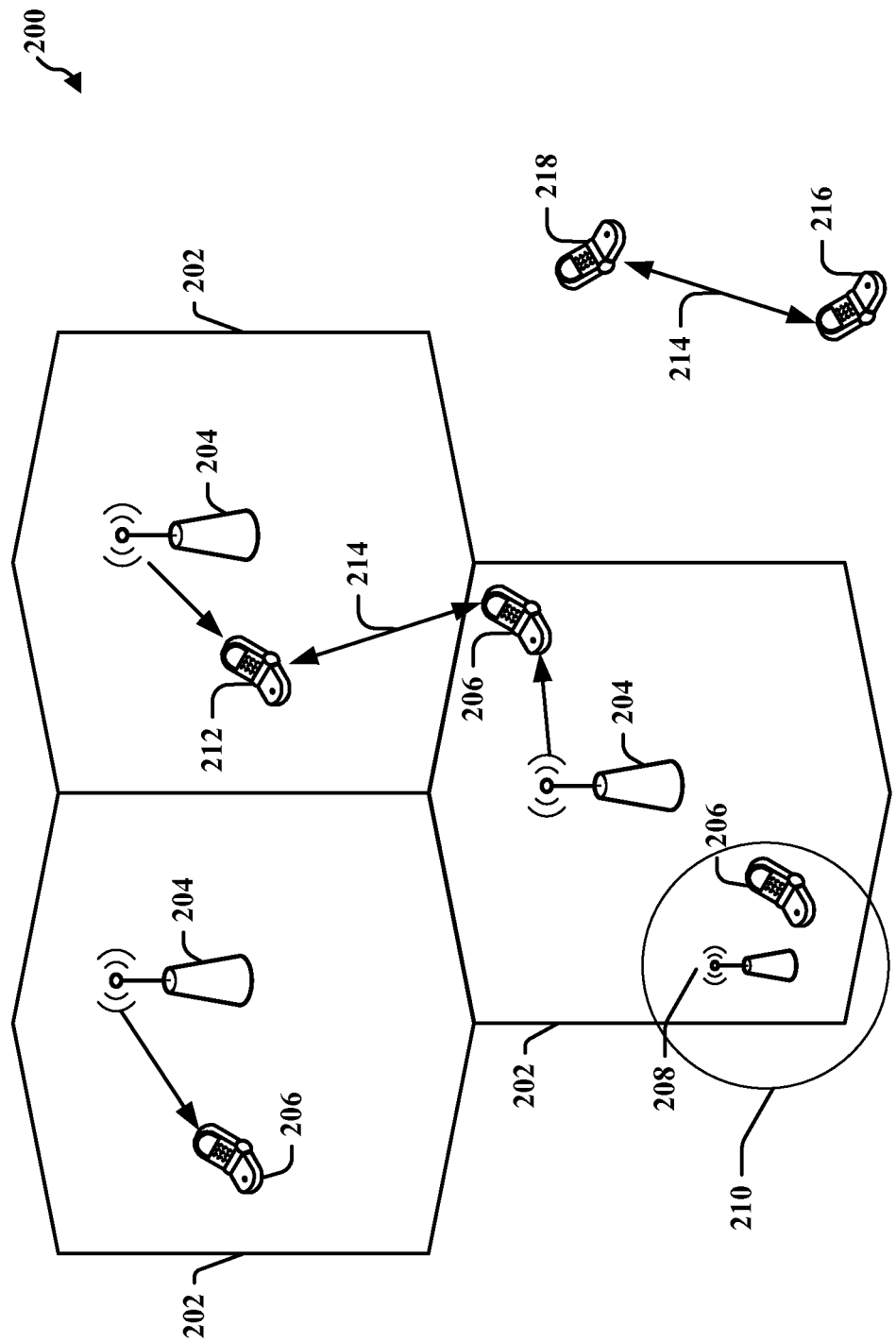
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

Further, some of the wireless devices 206, 212, 216, 218 may communicate together in peer-to-peer communication 214, some may communicate with the base station 204, and some may do both. For example, as shown in FIG. 2, the wireless devices 216, 218 may be in peer-to-peer communication 214 and the wireless devices 206, 212 may be in peer-to-peer communication 214. The wireless devices 206, 212 may also be in communication with the base station 204.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
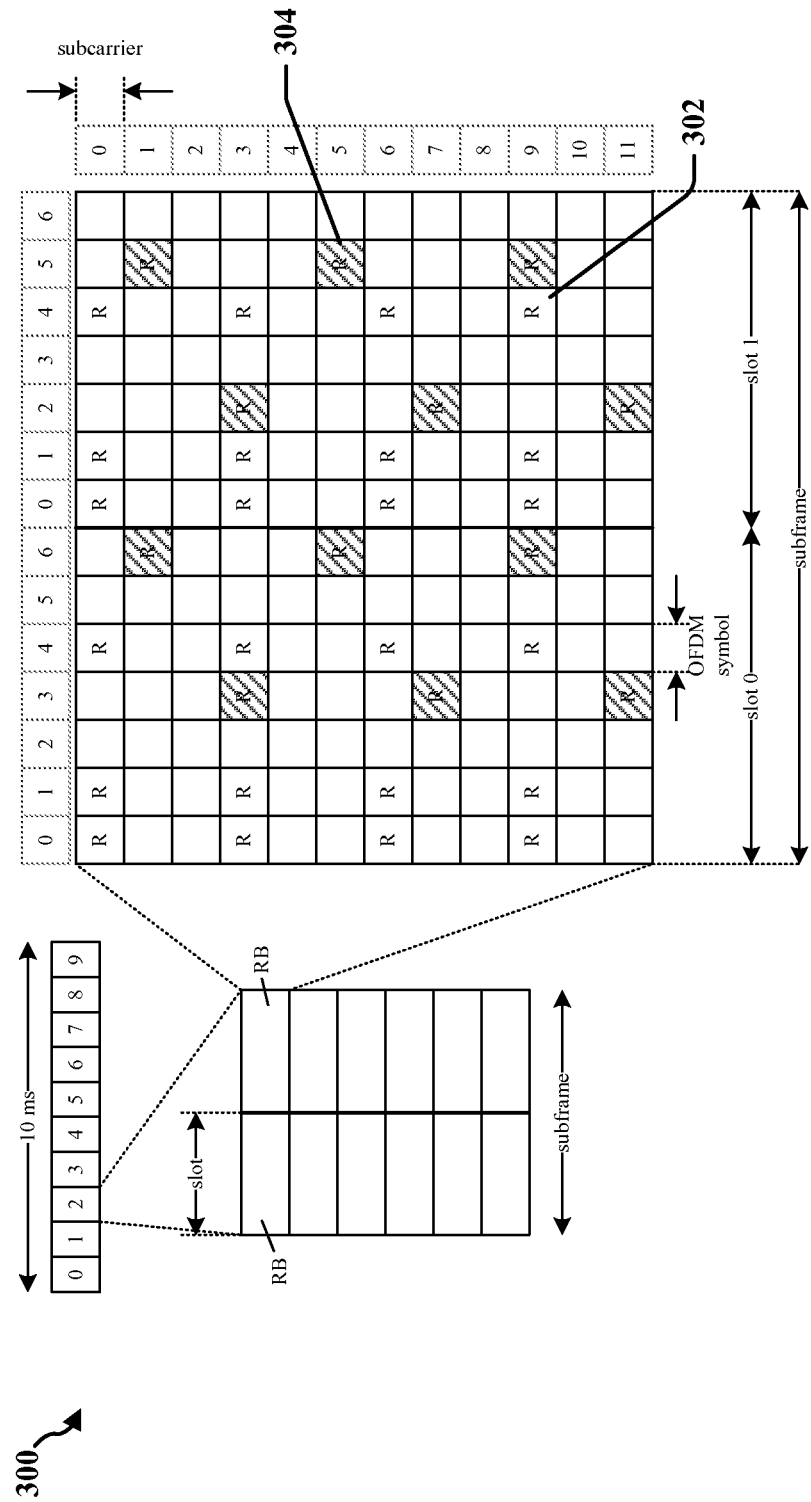
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
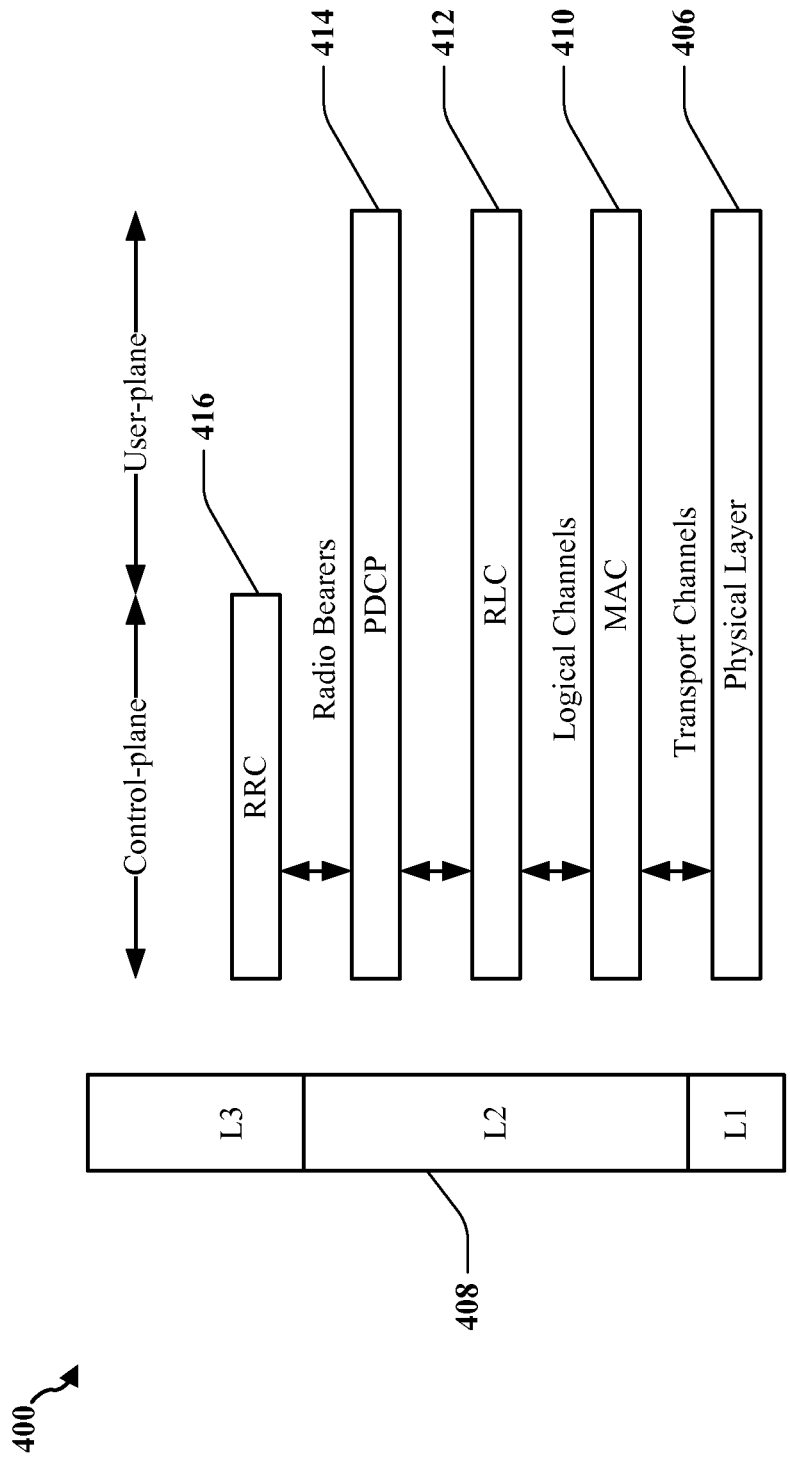
FIG. 4 is a diagram illustrating an example of a radio protocol architecture for the user and control planes.

FIG. 4 is a diagram 400 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 406. Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that is terminated at the PDN gateway 118 on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3 (L3 layer). The RRC sublayer 416 is responsible for obtaining radio resources (i.e., radio bearers) and for configuring the lower layers using RRC signaling between the eNB and the UE.

Figure 5:
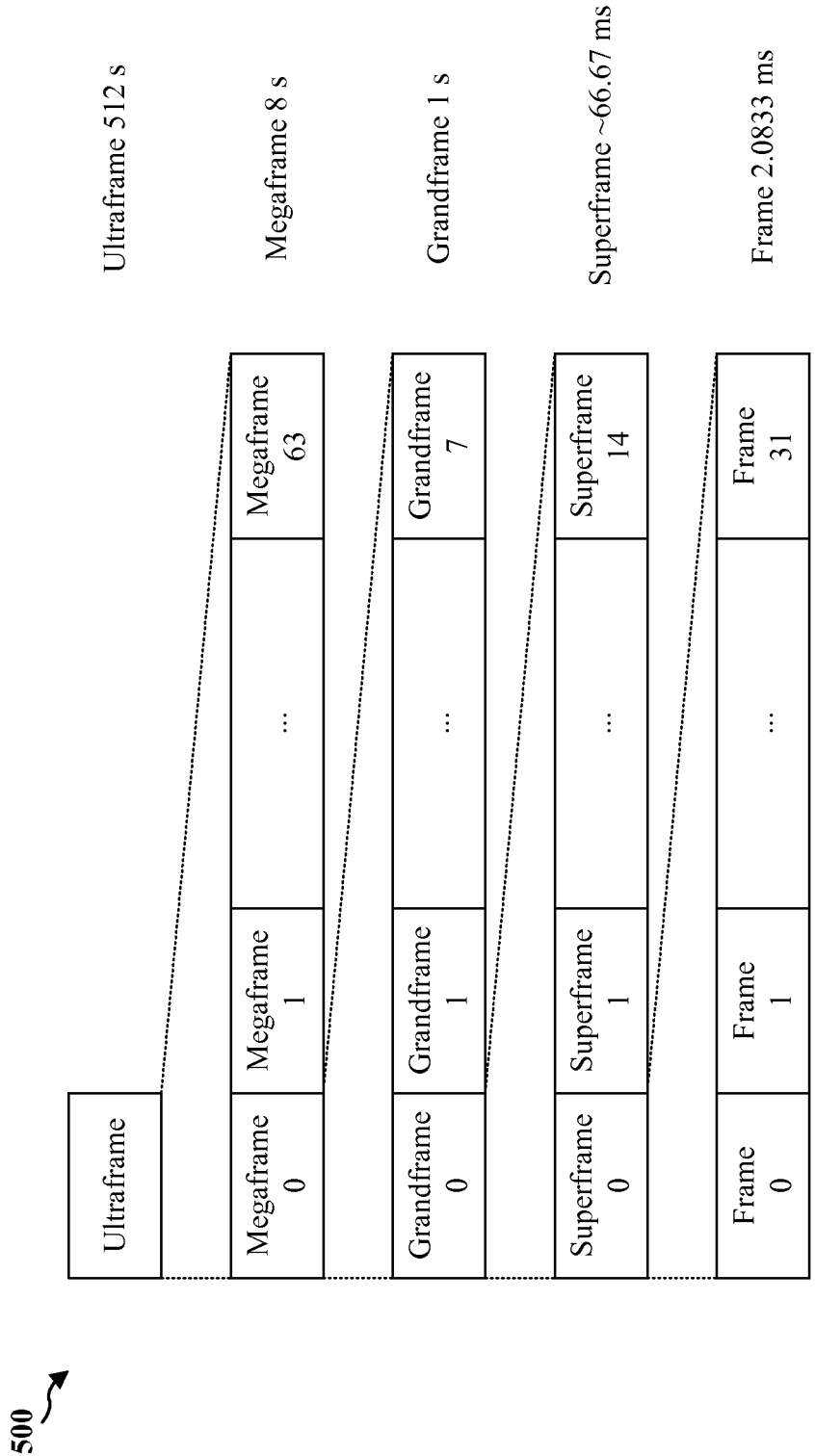
FIG. 5 is a diagram illustrating an exemplary time structure for peer-to-peer communication between the wireless devices.

FIG. 5 is a diagram 500 illustrating an exemplary time structure for peer-to-peer communication between the wireless devices. An ultraframe is 512 seconds and includes 64 megaframes. Each megaframe is eight seconds and includes eight grandframes. Each grandframe is one second and includes 15 superframes. Each superframe is approximately 66.67 ms and includes 32 frames. Each frame is 2.0833 ms.

FIG. 6 is a diagram 600 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the 2nd through 7th superframes (with index 1:6), frame 0 is a RCH and frames 1-31 are each a TCCH. In an 8th superframe (with index 7), frame 0 is a RCH, frames 1-10 are each a MCCH, and frames 11-31 are each a TCCH. In the 9th through 15th superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 7:
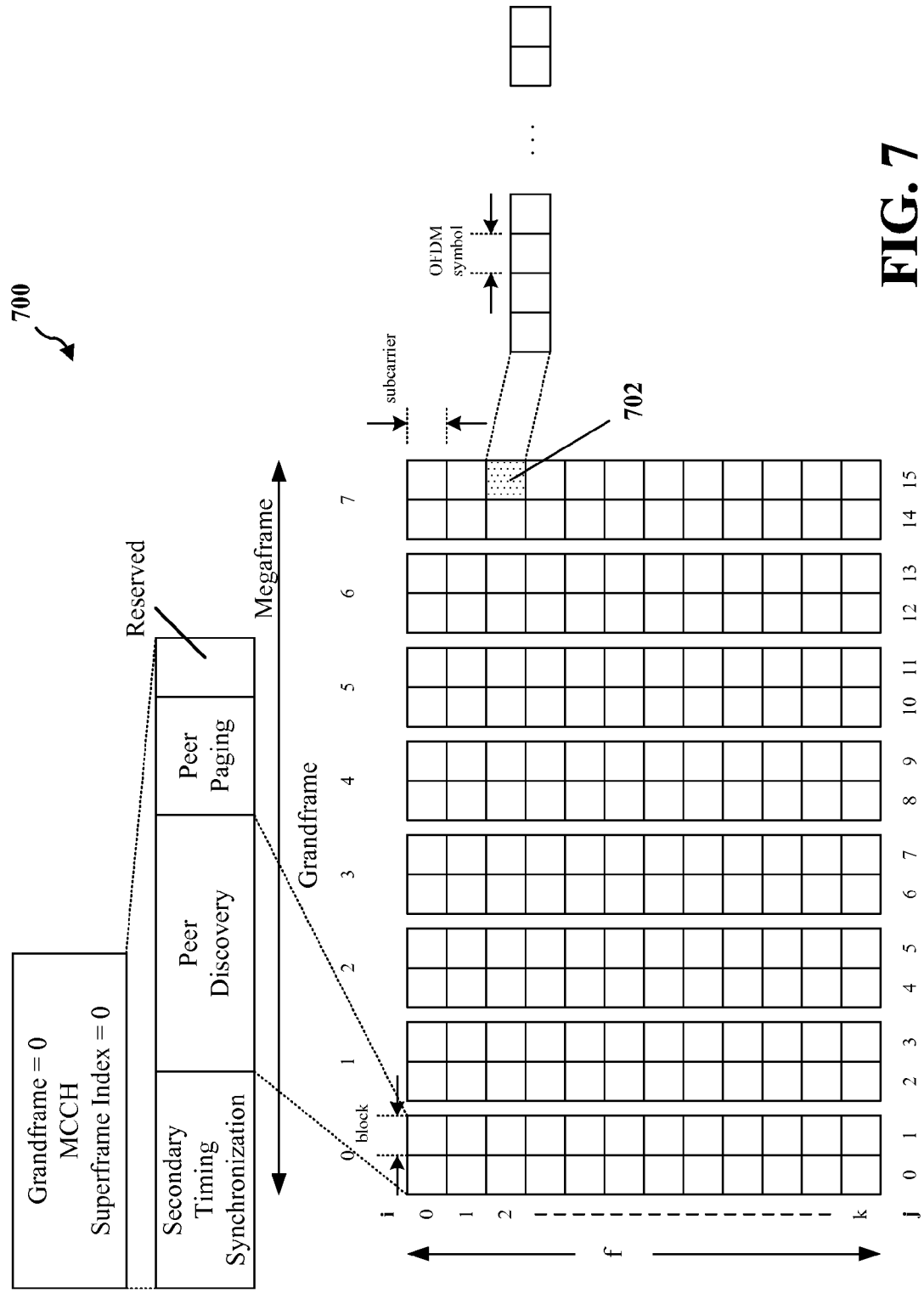
FIG. 7 is a diagram illustrating an operation timeline of a miscellaneous channel and a structure of a peer discovery channel.

FIG. 7 is a diagram 700 illustrating an operation timeline of the MCCH and an exemplary structure of a peer discovery channel. As discussed in relation to FIG. 6, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 7 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 702 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 8:
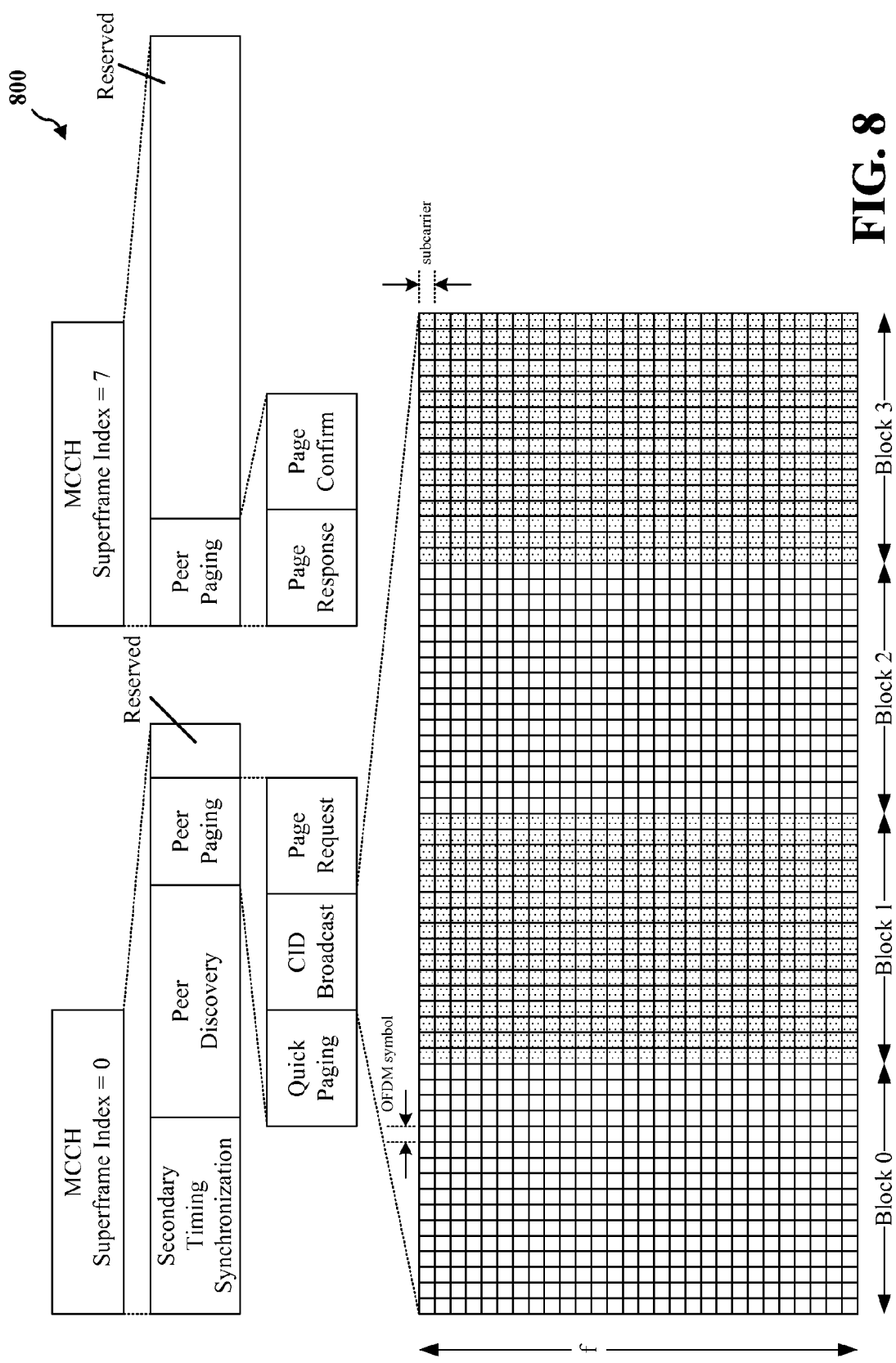
FIG. 8 is a diagram illustrating an operation timeline of a miscellaneous channel and a structure of a connection identifier broadcast.

FIG. 8 is a diagram 800 illustrating an operation timeline of the MCCH and a structure of a connection identifier (CID) broadcast. As discussed in relation to FIG. 6, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 9:
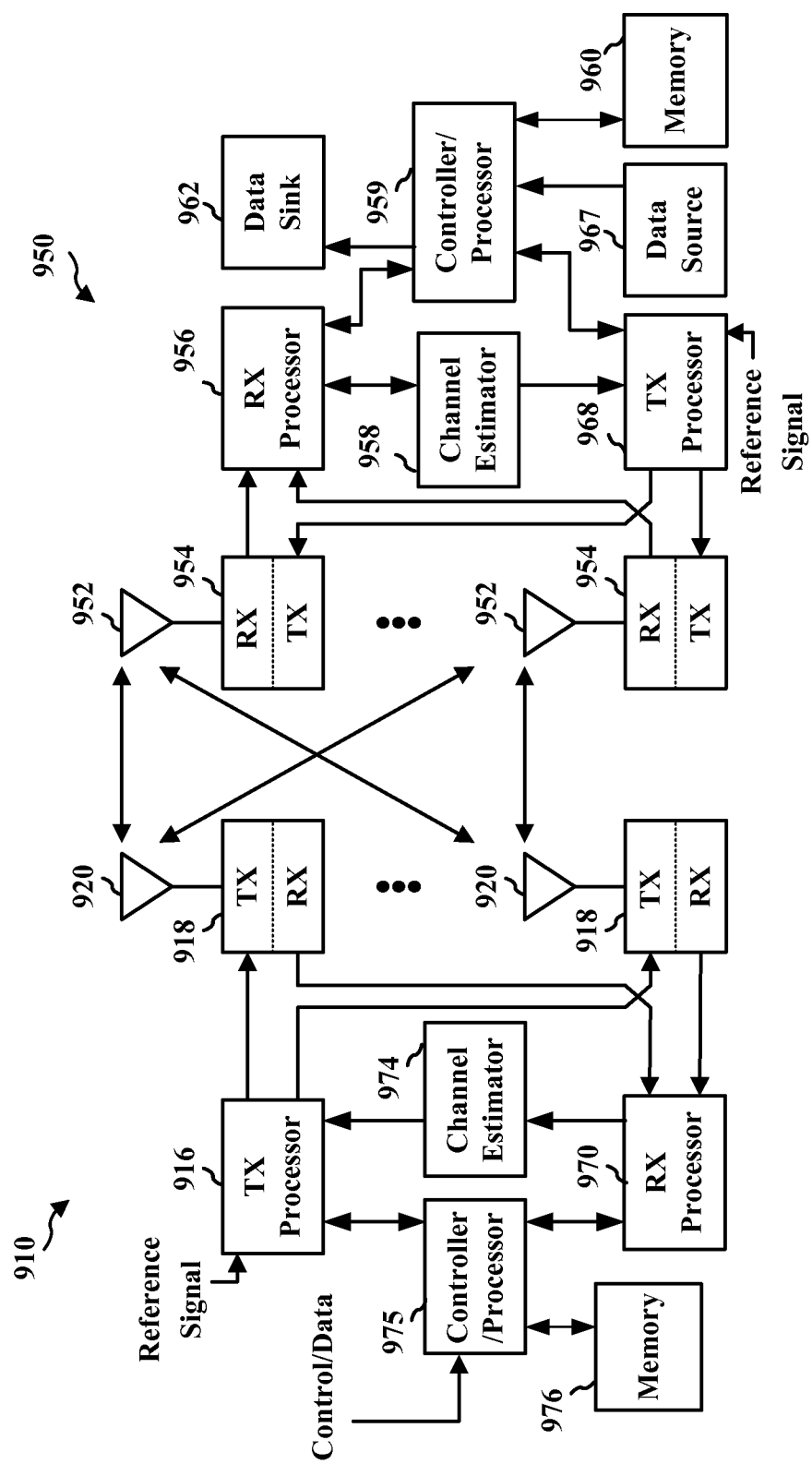
FIG. 9 is a diagram illustrating an example of an evolved Node B and user equipment in an access network.

FIG. 9 is a block diagram of an eNB 910 in communication with a UE 950 in an access network. In the DL, upper layer packets from the core network are provided to a controller/processor 975. The controller/processor 975 implements the functionality of the L2 layer. In the DL, the controller/processor 975 provides header compression, ciphering, packet segmentation and reordering, multiplexing between logical and transport channels, and radio resource allocations to the UE 950 based on various priority metrics. The controller/processor 975 is also responsible for HARQ operations, retransmission of lost packets, and signaling to the UE 950.

The transmit (TX) processor 916 implements various signal processing functions for the L1 layer (i.e., physical layer). The signal processing functions includes coding and interleaving to facilitate forward error correction (FEC) at the UE 950 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream is then provided to a different antenna 920 via a separate transmitter 918TX. Each transmitter 918TX modulates an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The RX processor 956 implements various signal processing functions of the L1 layer. The RX processor 956 performs spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 910. These soft decisions may be based on channel estimates computed by the channel estimator 958. The soft decisions are then decoded and deinterleaved to recover the data and control signals that were originally transmitted by the eNB 910 on the physical channel. The data and control signals are then provided to the controller/processor 959.

The controller/processor 959 implements the L2 layer. The controller/processor can be associated with a memory 960 that stores program codes and data. The memory 960 may be referred to as a computer-readable medium. In the UL, the control/processor 959 provides demultiplexing between transport and logical channels, packet reassembly, deciphering, header decompression, control signal processing to recover upper layer packets from the core network. The upper layer packets are then provided to a data sink 962, which represents all the protocol layers above the L2 layer. Various control signals may also be provided to the data sink 962 for L3 processing. The controller/processor 959 is also responsible for error detection using an acknowledgement (ACK) and/or negative acknowledgement (NACK) protocol to support HARQ operations.

In the UL, a data source 967 is used to provide upper layer packets to the controller/processor 959. The data source 967 represents all protocol layers above the L2 layer. Similar to the functionality described in connection with the DL transmission by the eNB 910, the controller/processor 959 implements the L2 layer for the user plane and the control plane by providing header compression, ciphering, packet segmentation and reordering, and multiplexing between logical and transport channels based on radio resource allocations by the eNB 910. The controller/processor 959 is also responsible for HARQ operations, retransmission of lost packets, and signaling to the eNB 910.

Channel estimates derived by a channel estimator 958 from a reference signal or feedback transmitted by the eNB 910 may be used by the TX processor 968 to select the appropriate coding and modulation schemes, and to facilitate spatial processing. The spatial streams generated by the TX processor 968 are provided to different antenna 952 via separate transmitters 954TX. Each transmitter 954TX modulates an RF carrier with a respective spatial stream for transmission.

The UL transmission is processed at the eNB 910 in a manner similar to that described in connection with the receiver function at the UE 950. Each receiver 918RX receives a signal through its respective antenna 920. Each receiver 918RX recovers information modulated onto an RF carrier and provides the information to a RX processor 970. The RX processor 970 may implement the L1 layer.

The controller/processor 975 implements the L2 layer. The controller/processor 975 can be associated with a memory 976 that stores program codes and data. The memory 976 may be referred to as a computer-readable medium. In the UL, the control/processor 975 provides demultiplexing between transport and logical channels, packet reassembly, deciphering, header decompression, control signal processing to recover upper layer packets from the UE 950. Upper layer packets from the controller/processor 975 may be provided to the core network. The controller/processor 975 is also responsible for error detection using an ACK and/or NACK protocol to support HARQ operations.

Figure 10:
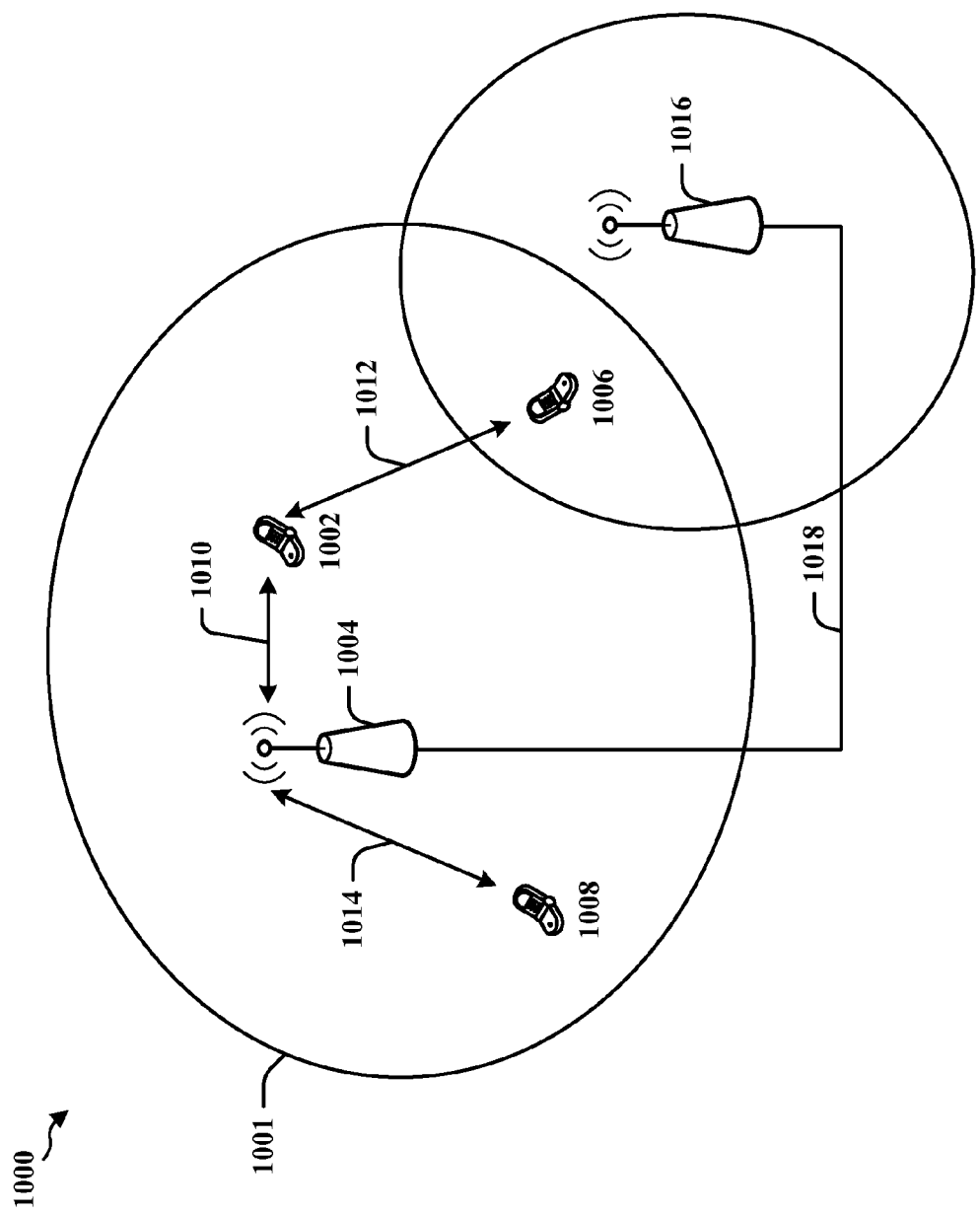
FIG. 10 is a diagram illustrating an example of an access network in which D2D communications may be performed according to an aspect.

FIG. 10 illustrates a wireless communications network 1000 that includes a plurality user equipments (UEs) (1002, 1006, 1008), and a plurality of evolved NodeBs (e.g., macro eNB 1102, one or more neighboring cell eNBs).

The UEs (1002, 1006, 1008) may be associated with eNBs (1004) and/or directly associated with each other through D2D communications 1012. The eNBs (1004, 1016) may be associated with different cells. In the depicted aspect, UE 1002 is within the coverage area 1001 of macro eNB 1004 and may receive a broadcast 1010 from eNB 1004. Further, UE 1002 may be directly associated with UE 106 through D2D communications 1012. Devices in neighboring cells may be allocated different sets of resources for D2D communication. On Uplink (UL) subframes where are least part of the spectral resources are used for communications between the UEs and the macro eNB 1004, the UEs (e.g., UE 1002)) that are close to the macro eNB 1004 may reduce their data transmission power to protect the macro eNB 1004 physical uplink control channel (PUCCH) for use by legacy UEs 1008 to communicate 1014 with the macro eNB 1004.

In operation, eNB 1004 may broadcast a fractional power control parameter that enabled UEs (e.g., UE 1002, 1006) may process to determine a maximum transmission power to use for D2D communications 1012. In another optional aspect, one or more neighbor eNBs 1016 may each communicate a fractional power control parameter 1018 for broadcast 1010 by eNB 1004. In one example aspect, wherein a macro eNB power saturation value is 65 dB, a margin needed to decode PUCCH when a UE transmits on non-PUCCH RBs may be defined in equation (1):

$$\text{Max. Power} = P^{PUCCH,edge} - PL^{max} + 65 \pm PL \qquad (1)$$

In one aspect, eNB 1004 may generate the factional power control parameter (x) from equation (1) using equation (2):

$$x = \{(P^{PUCCH,edge} - PL^{max} + 65) \qquad (2)$$

As such, a wireless communications environment 1000 is described in which a fractional power control parameter may be used to reduce potential interference between an eNB 1004 and one or more legacy UEs 1008 from UEs 1002, 1006 engaged in D2D communications 1012.

Figure 11:
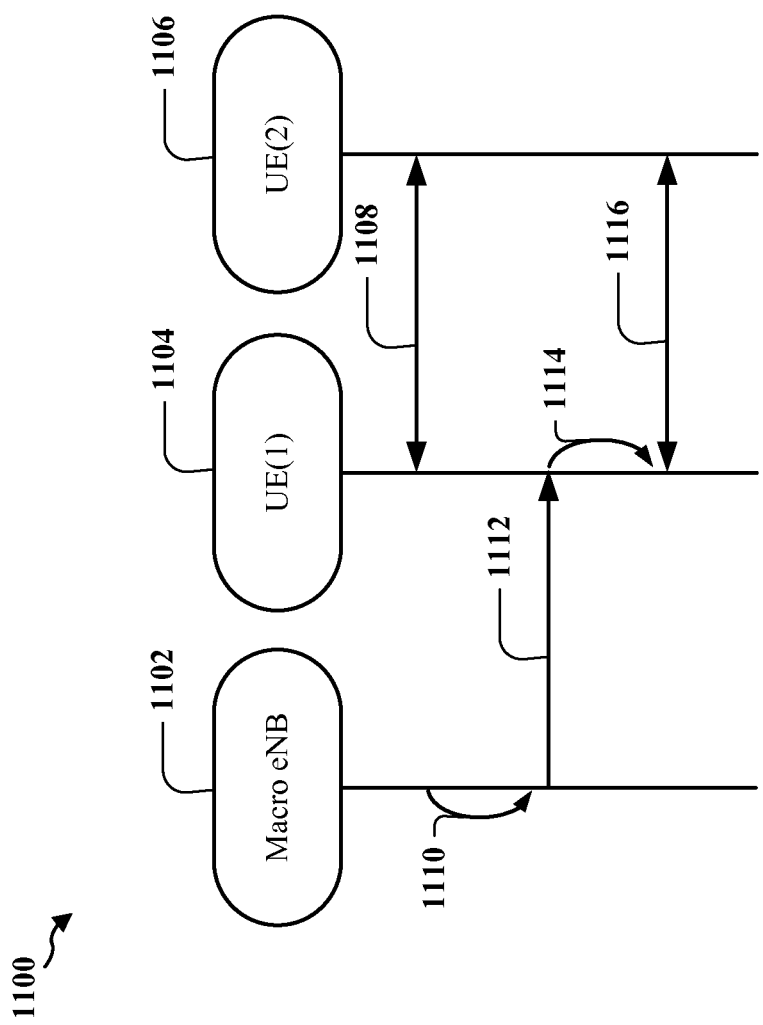
FIG. 11 is a call flow diagram of a communications an access network according to an aspect.

FIG. 11 illustrates an example call flow diagram of a wireless communications system 1100 including an eNB 1102 and a plurality UES (1104, 1106) that are operable to engage in D2D communications. Further, the system 1100 is operable to provide a factional power control parameter for a use by a UE within a threshold path gain of a macro eNB 1102 and engaged in D2D communications.

At act 1108, UEs (1104, 1106) may be engaged in direct D2D communications. At act 1110, macro eNB 1102 may detect that UE(1) 1104 is within a threshold path gain of macro eNB 1102. In one aspect, the path gain value used for the threshold may be dynamic and may depend at least in part of transmit power level perceived from UE(1) 1104. Further, at act 1110 macro eNB may generate a factional power control parameter based on power of a physical uplink control channel (PUCCH) at an edge of a coverage area of the macro eNB, a maximum path loss value, and a macro eNB power saturation value. In one aspect, the macro eNB power saturation value may be a function of the power amplifier used by the macro eNB. In one aspect, the fractional power control parameter may be generated based on equations (1) and (2) as described above.

At act 1112, the factional power control parameter may be transmitted to UE(1) 1104. At act 1114, UE(1) may calculate a maximum transmit power for D2D communications by determining a first minimum between the factional power control parameter plus a path loss value between the UE and the macro eNB and a maximum power used for the D2D communications. Such a calculation may be expressed in equation (3):

$$P^{D2D} = \min\{x + PL, P^{max}\} \qquad (3)$$

At act 1116, the UE(1) 1104 may maintain transmit power levels at or below the value determined through equation (3). In one aspect, since UE(1) 1104 measures reference signals (RSs) transmitted by neighboring eNBs, the same formula may be applied (with path loss being based on estimated path loss) on subframes which are allocated for D2D in neighboring cells. The estimated path loss can be determined via measurement reports which are obtained by the UE even in RRC idle state. In another aspect, the UE may be configured to either apply power control as given in equation (3) for eNBs with a closed subscriber group (CSG) or to all eNBs detected via measurement reports. Further, in subframes that are not used for D2D transmissions in neighboring cells, UE(1) 1104 may use the factional power control parameter on UL subframes. In another aspect, if the DL subframe in neighboring cell is used for D2D, path loss based power control may be used. In one aspect, UE(1) 1104 may used fractional power control with a different constants to result in a more conservative maximum transmit power value since a UE on the cell edge may be receiver in the neighboring cell.

Figure 12:
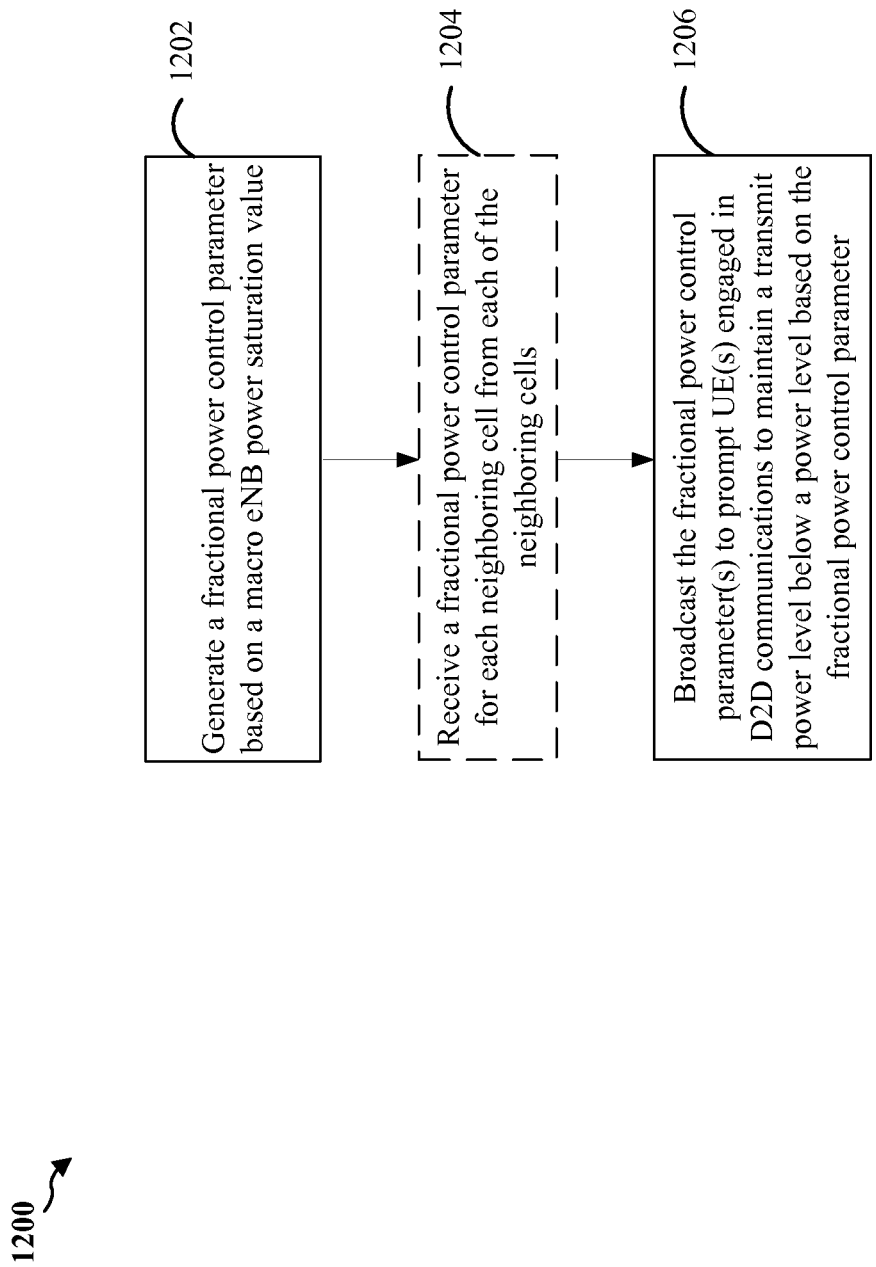
FIG. 12 is a flow chart of a method of wireless communication.

FIG. 12 is a flow chart 1200 of a method of wireless communication. The method may be performed by an eNB.

At block 1202, the eNB may generate a fractional power control parameter based on a macro eNB power saturation value. In one aspect, the macro eNB power saturation value may be approximately 65 dB. In one aspect, the fractional power parameter may be generated by determining a first value by subtracting a maximum path loss value from a power of the PUCCH at the edge of the coverage area of the macro eNB and adding the macro eNB power saturation value to the first value.

In an optional, at block 1204, the eNB may receive a fractional power control parameter for each of the one or more neighboring cells from each of the one or more neighboring cells.

At block 1206, the eNB may broadcast the fractional power control parameter to prompt one or more UEs engaged in D2D communications to maintain a transmit power level below a power level based on the fractional power control parameter. In one aspect, the D2D communications engaged in by the UEs are orthogonal in frequency to uplink communications received by the macro eNB from one or more other UEs. In an optional aspect, the broadcast may include a list including a fractional power control parameter for each of one or more neighboring cells. In such an optional aspect, inclusion of the one or more neighboring cells in the list depends on whether the one or more neighboring cells are a closed subscriber group cell, an open subscriber group cell, a macro eNB, a home eNB, a pico eNB, etc.

Figure 13:
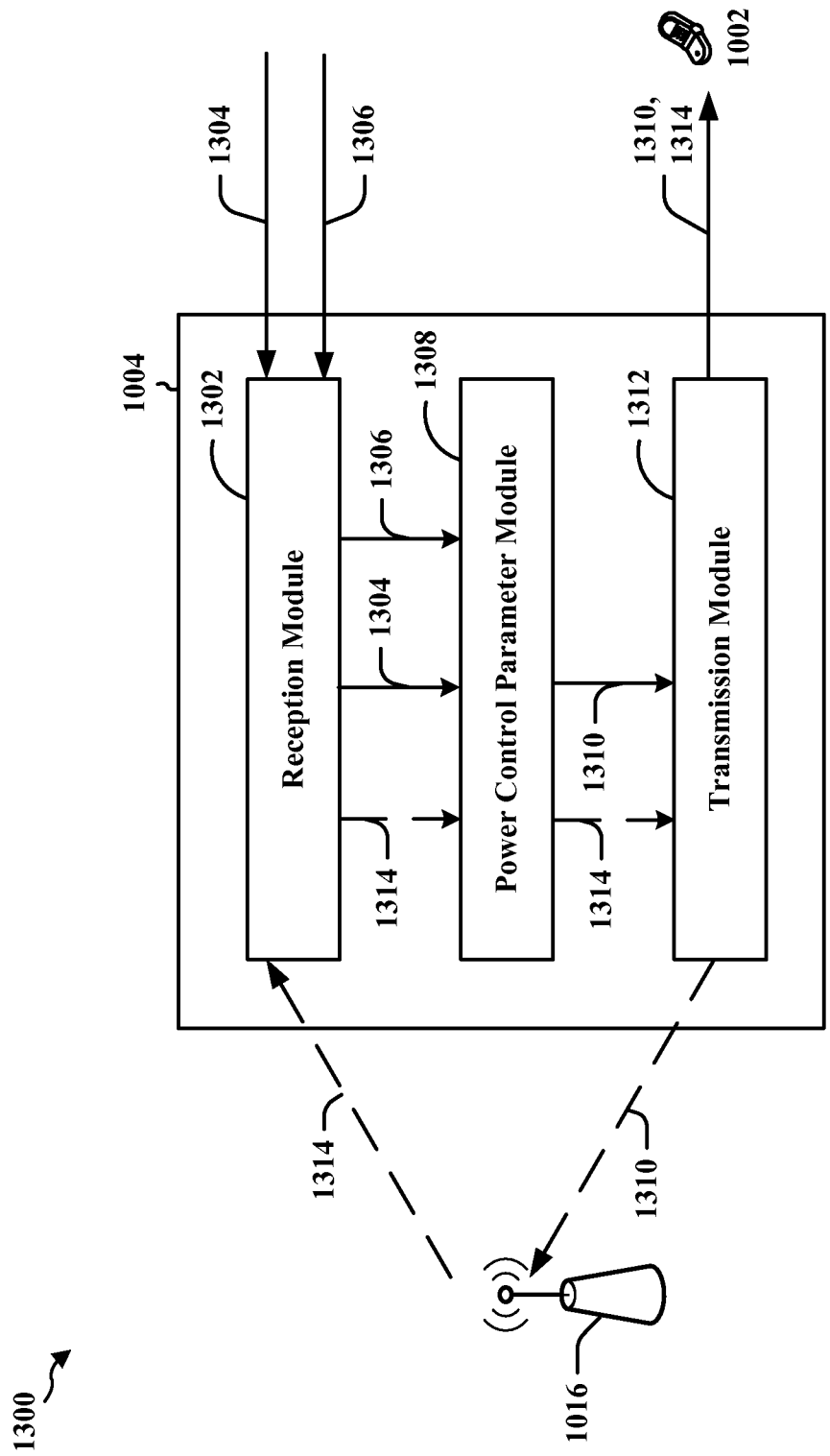
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1004. The apparatus 1004 includes a reception module 1302 that may receive various signals that allow apparatus to determine system performance values such as, but not limited to power of a physical uplink control channel (PUCCH) at an edge of a coverage area of the macro eNB 1304, a maximum path loss value 1306, etc. Further, in an optional aspect, reception module 1302 may receive a fractional power control parameter 1312 for each of the one or more neighboring cells from each of the one or more neighboring cells 1016. In an optional aspect, the transmission module 1312 broadcast may include fractional power control parameter 1314 for each of one or more neighboring cells 1016.

Apparatus 1004 further includes Power control parameter module 1308 that may be operable to generate a fractional power control parameter 1310 based on a macro eNB power saturation value. In one aspect, the macro eNB power saturation value may be approximately 65 dB. In one aspect, power control parameter module 1308 may generate the fractional power control parameter 1310 by determining a first value by subtracting the maximum path loss value 1306 from the power of the PUCCH at the edge of the coverage area of the macro eNB 1304, and adding the macro eNB power saturation value to the first value.

Apparatus 1004 further includes transmission module 1312 that is operable to broadcast the fractional power control parameter 1310 to prompt one or more user equipments (UEs) 1002 engaged in device to device (D2D) communications to maintain a transmit power level below a power level based on the fractional power control parameter 1310. In one aspect, the UEs 1002 engaged in D2D communications may be communicating orthogonal in frequency to uplink communications received by the macro eNB 1004 from one or more other UEs 1002. In an optional aspect, the transmission module 1312 broadcast may include fractional power control parameter 1314 for each of one or more neighboring cells 1016. In another optional aspect, transmission module 1312 may transmit the power control parameter for the cell to a neighboring cell 1016.

The apparatus may include additional modules that perform each of the steps of the algorithm in the aforementioned flow charts FIGS. 11 and 13. As such, each step in the aforementioned flow charts FIGS. 11 and 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
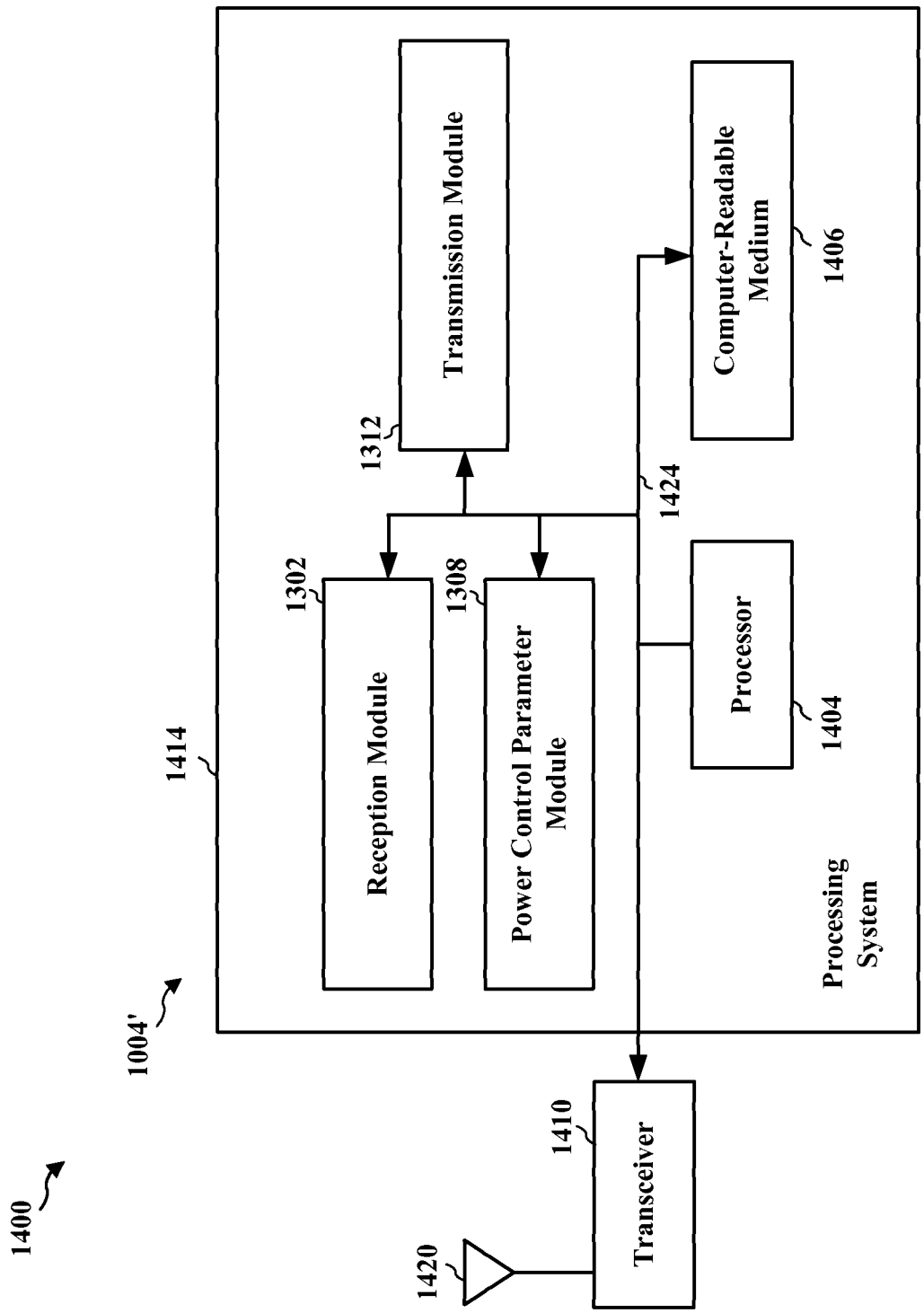
FIG. 14 is a diagram illustrating an example of a hardware implementation for an apparatus employing a processing system.

FIG. 14 is a diagram illustrating an example of a hardware implementation for an apparatus 1004' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1302, 1308, 1312, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1302, 1308, and 1312. The modules may be software modules running in the processor 1404, resident/stored in the computer readable medium 1406, one or more hardware modules coupled to the processor 1404, or some combination thereof.

In one configuration, the apparatus 1004/1004' for wireless communication includes means for generating a fractional power control parameter based on a macro eNB power saturation value, and means for broadcasting the fractional power control parameter to prompt one or more UEs engaged in D2D communications to maintain a transmit power level below a power level based on the fractional power control parameter. In one aspect, the D2D communications are orthogonal in frequency to uplink communications received by the macro eNB from one or more other UEs. In one aspect, the macro eNB power saturation value may be approximately 65 dB. The apparatus 1004/1004' for wireless communication may further include means for determining a first value by subtracting the maximum path loss value from the power of the PUCCH at the edge of the coverage area of the macro eNB, and means for determining the fractional power control parameter by adding the macro eNB power saturation value to the first value. The apparatus 1004/1004' for wireless communication may further include means for broadcasting a list including a fractional power control parameter for each of one or more neighboring cells. In one aspect, inclusion of the one or more neighboring cells in the list may depend on whether the one or more neighboring cells are a closed subscriber group cell, an open subscriber group cell, a macro eNB, a home eNB, a pico eNB, etc. The apparatus 1004/1004' for wireless communication may further include means for receiving the fractional power control parameter for each of the one or more neighboring cells from each of the one or more neighboring cells.

The aforementioned means may be one or more of the aforementioned modules of the apparatus 1004 and/or the processing system 1414 of the apparatus 1004' configured to perform the functions recited by the aforementioned means.

Figure 15:
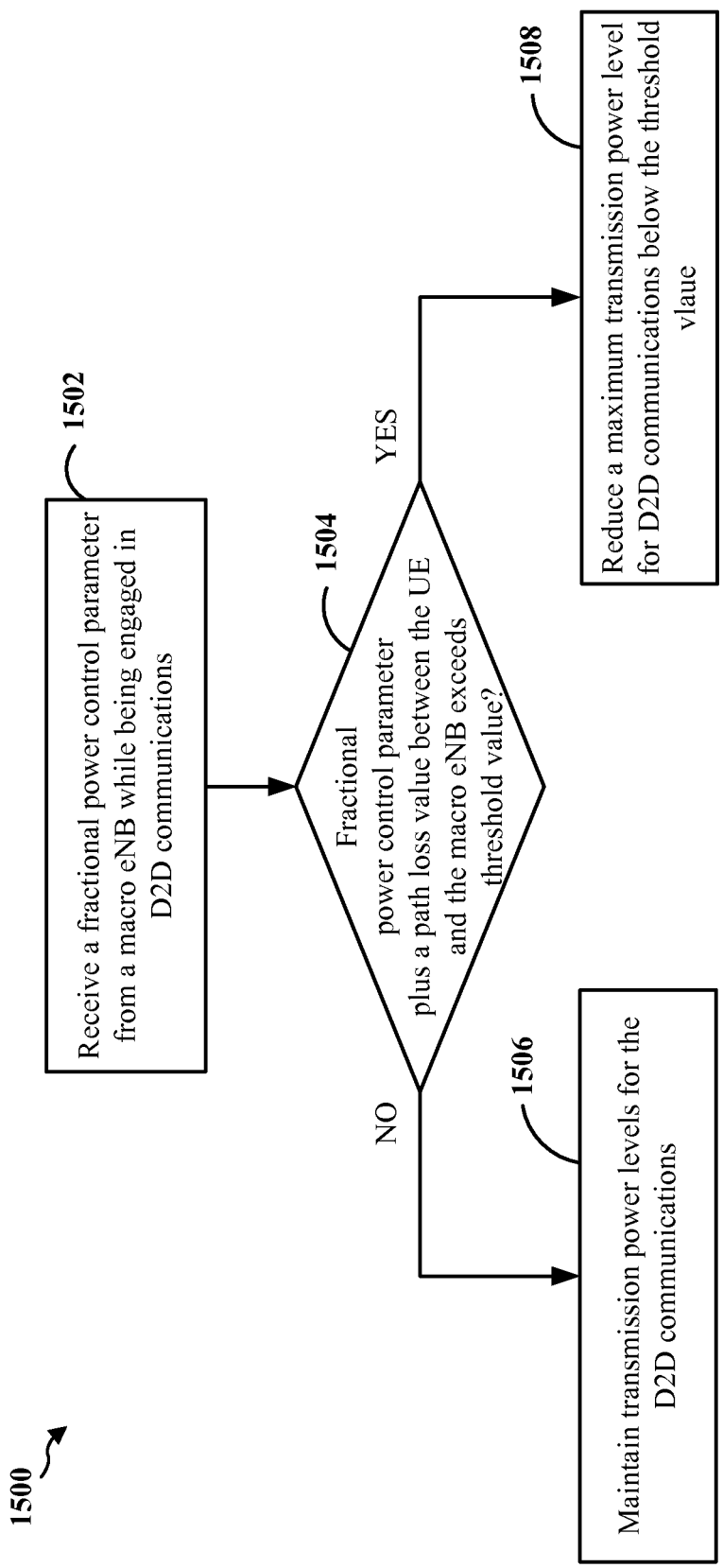
FIG. 15 is a flow chart of a method of wireless communication.

FIG. 15 is a flow chart 1500 of a method of wireless communication. The method may be performed by a user equipment (UE).

At block 1502, the UE may receive a fractional power control parameter from a macro eNB while being engaged in D2D communications. In one aspect, the received factional power control parameter may include a fractional power control parameter for each of one or more neighboring cells. In one aspect, the fractional power control parameter may include a power of a PUCCH at the edge of the coverage area of the macro eNB less a maximum path loss value plus a macro eNB power saturation value.

At block 1504, the UE may determine whether the a first value, defined by the fractional power control parameter plus a path loss value between the UE and the macro eNB, is less than a second value defined by a maximum power used for the D2D communications. In another aspect, the UE may determine a third value defined by the fractional power control parameter plus a path loss value between the UE and a neighboring cell eNB is less than the second value.

If, at block 1504, the UE determines that the first value is not less than the second value, then at block 1506, the UE may maintain transmission power levels for the D2D communications. Similarly, where a third value has been determined at block 1504 and where the UE determines that the third value is not less than the second value, the UE may maintain D2D communications transmission power levels. In such an aspect, the transmission power levels for D2D communications may be maintained for UL subframes associated with the neighboring cell. In another aspect, where a subframe is used for D2D communications in the cell is a DL subframe in a neighboring cell, a multiplier may be applied to the fractional power control parameter to result in a smaller value for the fractional power control parameter plus a path loss value between the UE and the macro eNB.

By contrast, if at block 1504, the UE determines that the first value is less than the second value, then at block 1508, the UE may reduce a maximum transmission power level for D2D communications to the first value. Similarly, where a third value has been determined at block 1504 and where the UE determines that the third value is not less than the second value, the UE may reduce a maximum transmission power level for D2D communications to the third value.

Figure 16:
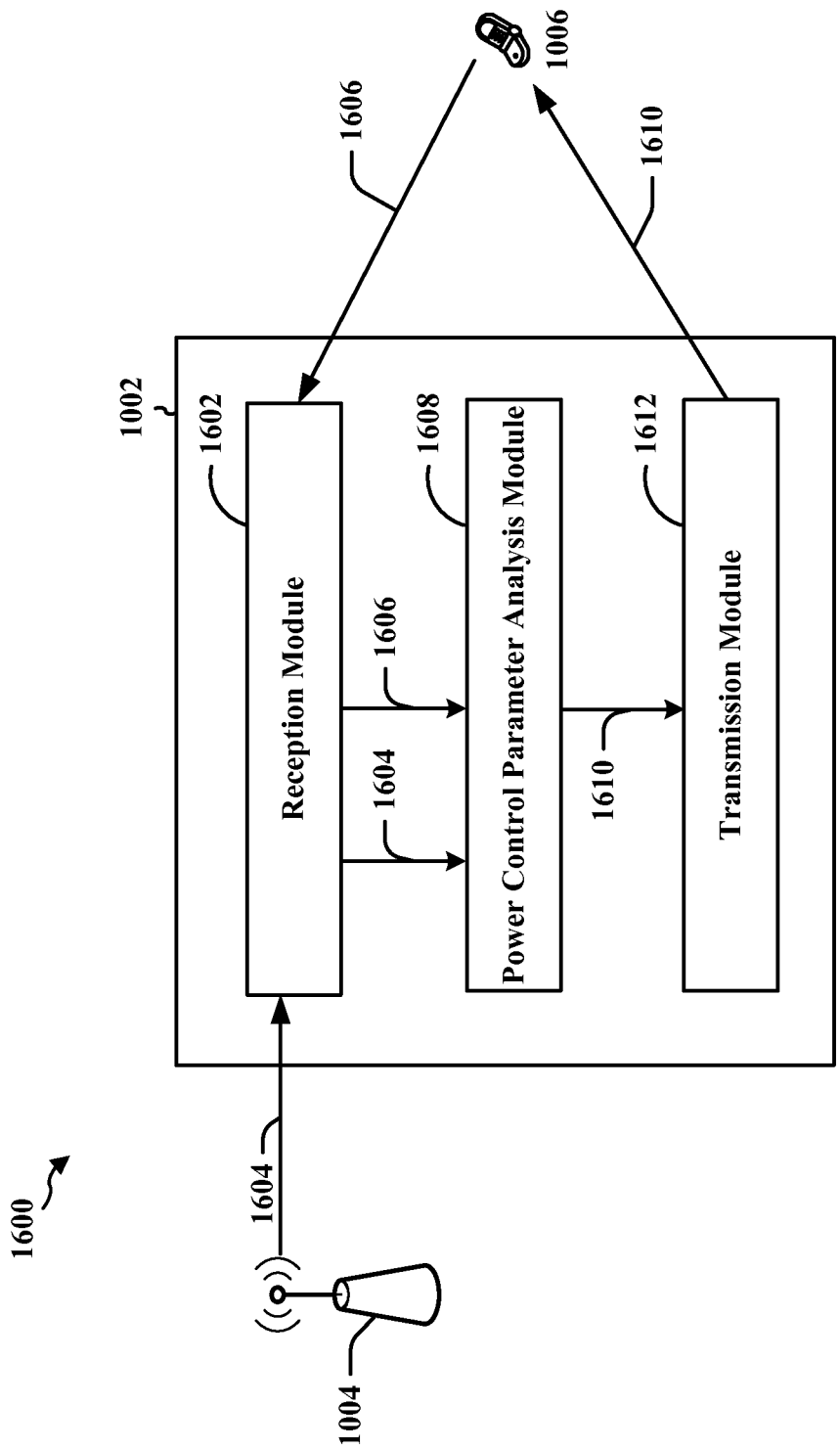
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1002. The apparatus 1002 includes a reception module 1602 that is operable to receive a fractional power control parameter 1604 from a macro eNB 1005 while being engaged in D2D communications with another UE 1006. In one aspect, the fractional power control parameter 1604 may include a list of a fractional power control parameter for each of one or more neighboring cells.

The apparatus further includes a power control parameter analysis module 1608 that is operable to determine whether the a first value, defined by the fractional power control parameter 1604 plus a path loss value between the UE and the macro eNB 1004, is less than a second value defined by a maximum power used for the D2D communications 1606. Where power control parameter analysis module 1608 determines that the first value is greater than the second value, then the UE 1002 may maintain the transmit power that was being used for D2D communications. Where power control parameter analysis module 1608 determines that the first value is greater than the second value, then the power control parameter analysis module 1608 may use a reduced maximum transmission power level for D2D communications 1610. In one aspect, power control parameter analysis module 1608 may determine whether a third value defined by the fractional power control parameter 1604 plus a path loss value between the UE 1002 and a neighboring cell eNB is less than the second value. In such an aspect, where power control parameter analysis module 1608 determines that the third value is greater than the second value, then the UE 1002 may maintain the transmit power that was being used for D2D communications. Further, in such an aspect, where power control parameter analysis module 1608 determines that the third value is greater than the second value, then the power control parameter analysis module 1608 may use a reduced maximum transmission power level for D2D communications 1610. In another aspect, apparatus 1002 may be operable to determine that a subframe used for D2D communications in the cell associated with the macro eNB is a DL subframe in a neighboring cell, and power control parameter analysis module 1608 may be operable to apply a multiplier to the received fractional power control parameter to result in a smaller value for the fractional power control parameter plus a path loss value between the UE and the macro eNB.

The apparatus may further include a transmission module 1612 that is operable to assist in performing D2D communications. In one aspect, transmission module 1612 may engage in D2D communications using a maximum transmission power level 1610 determined by power control parameter analysis module 1608.

The apparatus may include additional modules that perform each of the steps of the algorithm in the aforementioned flow chart FIGS. 11 and 15. As such, each step in the aforementioned flow chart FIGS. 11 and 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
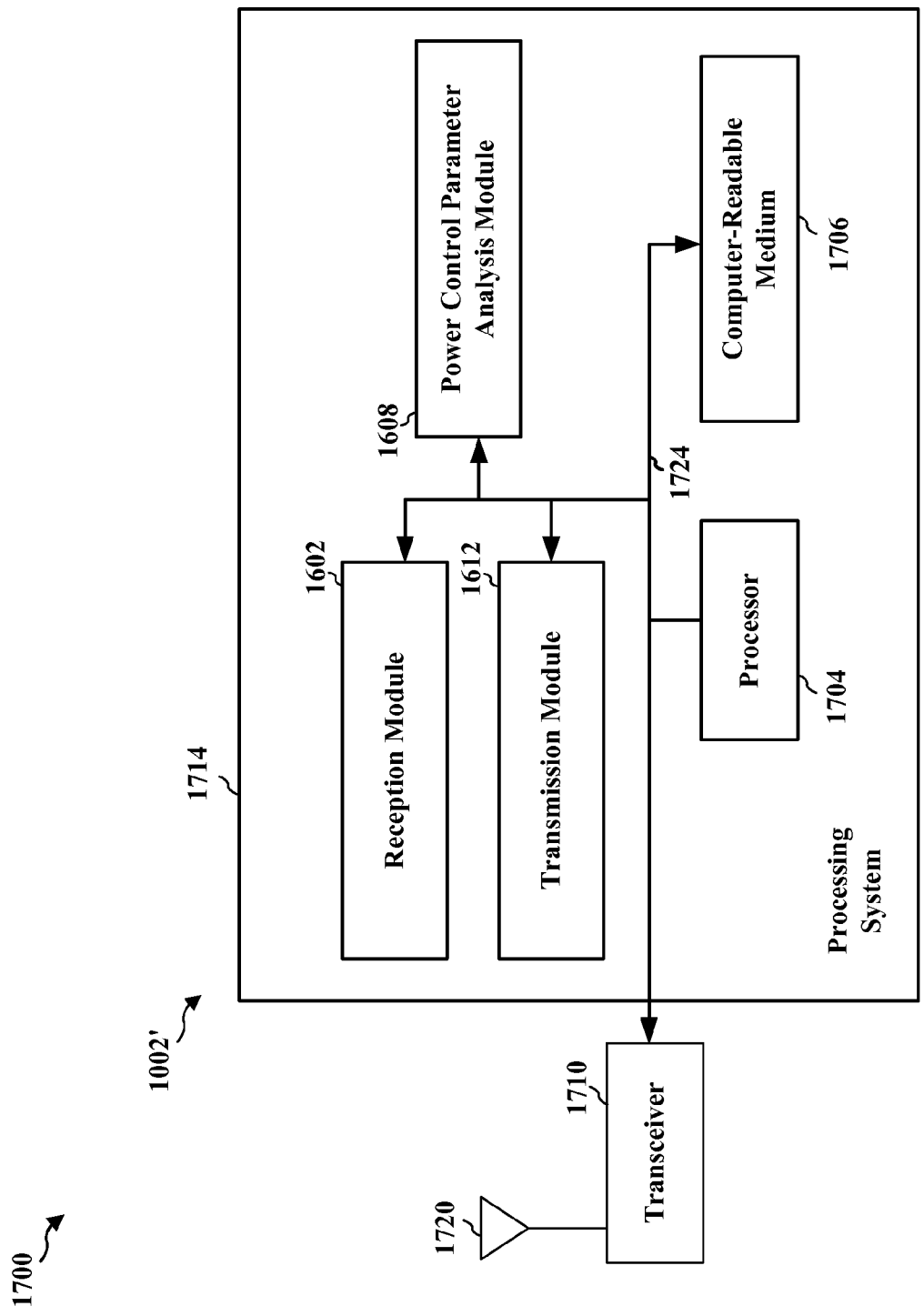
FIG. 17 is a diagram illustrating an example of a hardware implementation for an apparatus employing a processing system.

FIG. 17 is a diagram illustrating an example of a hardware implementation for an apparatus 1002' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1602, 1608, 1612, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus.

The computer-readable medium 1706 may also be used for storing data that is manipulated by the processor 1704 when executing software. The processing system further includes at least one of the modules 1602, 1608, and 1612. The modules may be software modules running in the processor 1704, resident/stored in the computer readable medium 1706, one or more hardware modules coupled to the processor 1704, or some combination thereof.

In one configuration, the apparatus 1002/1002' for wireless communication includes means for receiving, by a UE, a fractional power control parameter from a macro eNB while being engaged in D2D communications, and means for determining whether the a first value, defined by the fractional power control parameter plus a path loss value between the UE and the macro eNB, is less than a second value defined by a maximum power used for the D2D communications. Apparatus 1002/1002' may include means for reducing a maximum transmission power level for D2D communications to the first value when the first value is determined to be less than the second value. In one aspect, apparatus 1002/1002' may include means for determining whether a third value defined by the fractional power control parameter plus a path loss value between the UE and a neighboring cell eNB is less than the second value, and means for maintaining transmission power levels for the D2D communications when the third value is not determined to be less than the second value, or means for reducing a maximum transmission power level for D2D communications to the third value when the third value is determined to be less than the second value. In such an aspect, apparatus 1002/1002' may include means for receiving a list including a fractional power control parameter for each of one or more neighboring cells. In such an aspect, the factional power control power selected from the list to be used to determine the third value may be based on a cell identifier of the neighboring cell eNB. In another aspect, the transmission power levels for D2D communications may be maintained for UL subframes associated with the neighboring cell. In one aspect, apparatus 1002/1002' may include means determining that a subframe used for D2D communications in the cell associated with the macro eNB is a DL subframe in a neighboring cell, and means for applying a multiplier to the received fractional power control parameter to result in a smaller value for the fractional power control parameter plus a path loss value between the UE and the macro eNB. In one aspect, the fractional power control parameter may include a power of a PUCCH at the edge of the coverage area of the macro eNB less a maximum path loss value plus a macro eNB power saturation value.

The aforementioned means may be one or more of the aforementioned modules of the apparatus 1002 and/or the processing system 1714 of the apparatus 1002' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
generating a fractional power control parameter based on a macro evolved nodeB (eNB) power saturation value; and
broadcasting the fractional power control parameter to prompt one or more user equipments (UEs) engaged in device to device (D2D) communications to maintain a transmit power level below a power level based on the fractional power control parameter.

2. The method of claim 1, wherein the fractional power control parameter is further based on at least one of: power of a physical uplink control channel (PUCCH) at an edge of a coverage area of the macro eNB, or a maximum path loss value.

3. The method of claim 2, wherein the generating the fractional power control parameter further comprises:
determining a first value by subtracting the maximum path loss value from the power of the PUCCH at the edge of the coverage area of the macro eNB; and
determining the fractional power control parameter by adding the macro eNB power saturation value to the first value.

4. The method of claim 1, wherein the D2D communications are orthogonal in frequency to uplink communications received by the macro eNB from one or more other UEs.

5. The method of claim 1, wherein the broadcasting further comprises broadcasting a list including a fractional power control parameter for each of one or more neighboring cells.

6. The method of claim 5, wherein inclusion of the one or more neighboring cells in the list depends on whether the one or more neighboring cells are at least one of:
a closed subscriber group cell; an open subscriber group cell; a macro eNB; a home eNB; or a pico eNB.

7. The method of claim 5, further comprising receiving the fractional power control parameter for each of the one or more neighboring cells from each of the one or more neighboring cells.

8. An apparatus for wireless communication, comprising:
means for generating a fractional power control parameter based on a macro evolved nodeB (eNB) power saturation value; and
means for broadcasting the fractional power control parameter to prompt one or more user equipments (UEs) engaged in device to device (D2D) communications to maintain a transmit power level below a power level based on the fractional power control parameter.

9. The apparatus of claim 8, wherein the fractional power control parameter is further based on at least one of: power of a physical uplink control channel (PUCCH) at an edge of a coverage area of the macro eNB, or a maximum path loss value.

10. The apparatus of claim 9, wherein the means for generating the fractional power control parameter is configured to:
Determine a first value by subtracting the maximum path loss value from the power of the PUCCH at the edge of the coverage area of the macro eNB; and
Determine the fractional power control parameter by adding the macro eNB power saturation value to the first value.

11. The apparatus of claim 8, wherein the D2D communications are orthogonal in frequency to uplink communications received by the macro eNB from one or more other UEs.

12. The apparatus of claim 8, wherein the means for broadcasting is configured to broadcast a list including a fractional power control parameter for each of one or more neighboring cells.

13. The apparatus of claim 12, wherein inclusion of the one or more neighboring cells in the list depends on whether the one or more neighboring cells are at least one of:
a closed subscriber group cell; an open subscriber group cell; a macro eNB; a home eNB; or a pico eNB.

14. The apparatus of claim 12, further comprising means for receiving the fractional power control parameter for each of the one or more neighboring cells from each of the one or more neighboring cells.

15. An apparatus for wireless communication, comprising:
a processing system configured to:
generate a fractional power control parameter based on a macro evolved nodeB (eNB) power saturation value; and
broadcast the fractional power control parameter to prompt one or more user equipments (UEs) engaged in device to device (D2D) communications to maintain a transmit power level below a power level based on the fractional power control parameter.

16. The apparatus of claim 15, wherein the fractional power control parameter is further based on at least one of: power of a physical uplink control channel (PUCCH) at an edge of a coverage area of the macro eNB, or a maximum path loss value.

17. The apparatus of claim 16, wherein the processing system is further configured to:
determine a first value by subtracting the maximum path loss value from the power of the PUCCH at the edge of the coverage area of the macro eNB; and
determine the fractional power control parameter by adding the macro eNB power saturation value to the first value.

18. The apparatus of claim 15, wherein the D2D communications are orthogonal in frequency to uplink communications received by the macro eNB from one or more other UEs.

19. The apparatus of claim 15, wherein the processing system is further configured to broadcast a list including a fractional power control parameter for each of one or more neighboring cells.

20. The apparatus of claim 19, wherein inclusion of the one or more neighboring cells in the list depends on whether the one or more neighboring cells are at least one of:
a closed subscriber group cell; an open subscriber group cell; a macro eNB; a home eNB; or a pico eNB.

21. The apparatus of claim 19, wherein the processing system is further configured to receive the fractional power control parameter for each of the one or more neighboring cells from each of the one or more neighboring cells.

22. A non-transitory computer-readable storage medium stores instructions executable by one or more processors for:
generating a fractional power control parameter based on a macro-evolved nodeB (eNB) power saturation value; and
broadcasting the fractional power control parameter to prompt one or more user equipments (UEs) engaged in device to device (D2D) communications to maintain a transmit power level below a power level based on the fractional power control parameter.

\* \* \* \* \*